United States Patent
Sigl et al.

[11] Patent Number: 5,505,899
[45] Date of Patent: Apr. 9, 1996

[54] PROCESS FOR PRODUCING BODIES BASED ON BORON CARBIDE BY PRESSURELESS SINTERING

[75] Inventors: Lorenz Sigl, Lechaschau, Austria; Hubert Thaler, Kempten; Karl-Alexander Schwetz, Sulzberg, both of Germany

[73] Assignee: Elektroschmelzwerk Kempten GmbH, Munich, Germany

[21] Appl. No.: 260,895

[22] Filed: Jun. 16, 1994

[30] Foreign Application Priority Data

Jun. 17, 1993 [DE] Germany .......................... 43 20 102.4

[51] Int. Cl.$^6$ .................................................. C01B 31/00
[52] U.S. Cl. .................................. 264/297; 264/66
[58] Field of Search .................... 264/66, 29.7; 423/291; 501/87

[56] References Cited

U.S. PATENT DOCUMENTS

| | | | |
|---|---|---|---|
| 23,789 | 2/1954 | Montgomery . | |
| 4,195,066 | 3/1980 | Schwetz et al. | 423/291 |
| 4,670,408 | 6/1987 | Petzow et al. | 501/87 |
| 4,904,623 | 2/1990 | Petzow et al. | 501/96 |
| 5,108,962 | 4/1992 | Khazai et al. | 501/87 |
| 5,342,811 | 8/1994 | Khazai et al. | 501/87 |

FOREIGN PATENT DOCUMENTS 0494390  7/1992  European Pat. Off. .
2751998  5/1979  Germany .

OTHER PUBLICATIONS

American Institute of Physics, Conference Proceedings Boron-Rich Solids, No. 214, pp. 464–467 Zakhariev and Radev "Dense Material obtained on the basis of Boron Carbide sintered without pressing".

Primary Examiner—Christopher A. Fiorilla
Attorney, Agent, or Firm—Collard & Roe

[57] ABSTRACT

A process for producing shaped bodies of boron carbide, metal diboride and carbon, which includes (a) homogeneously mixing pulverulent boron carbide with at least one pulverulent monocarbide of an element Ti, Zr, Hf, V, Nb and Ta in an amount corresponding to from 2% to 6% by weight of free carbon, based on the total weight of the boron carbide;

(b) shaping this mixture into green bodies of a density of at least 50% TD;

(c) heating the preformed body thus obtained to from about 1250° C. to 1450° C. with exclusion of oxygen in a sintering furnace and maintaining it within this temperature range for from 10 to 120 minutes; and (d) subsequently sintering the preformed body by heating to from 2100° C. to 2250° C.

4 Claims, 2 Drawing Sheets

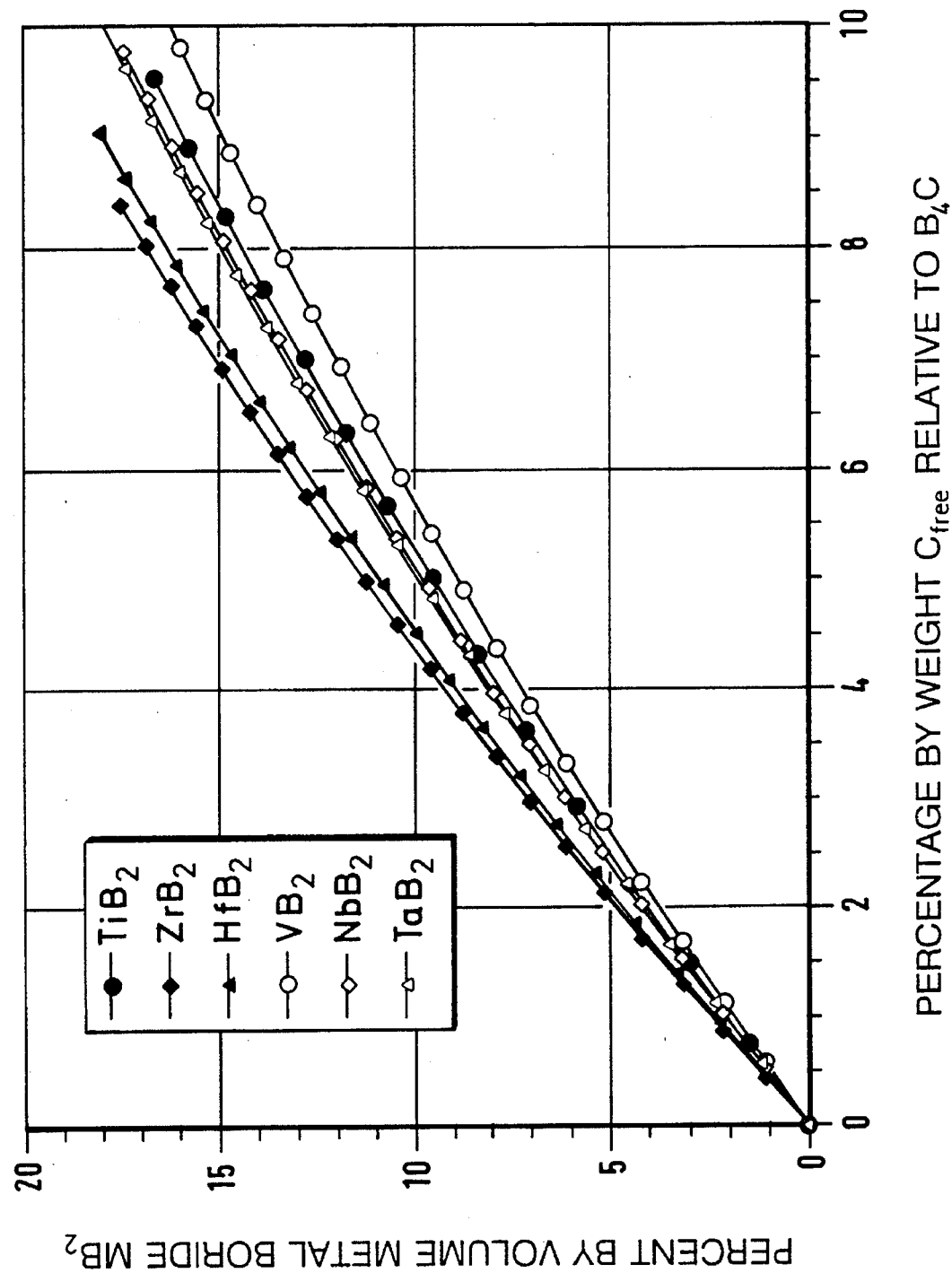

PROCESS FOR PRODUCING BODIES BASED ON BORON CARBIDE BY PRESSURELESS SINTERING

BACKGROUND OF THE INVENTION

1. Field of the Invention

The present invention relates to a process for producing polycrystalline dense shaped bodies based on boron carbide by pressureless sintering.

2. The Prior Art

Boron carbide is a material which can be densified without pressure only by addition of sintering aids. DE 275 19 98 (corresponding to U.S. Pat. No. 4,195,066) teaches that suitable sintering aids are carbon-containing substances in the form of phenolic resins which are converted by pyrolysis to amorphous carbon, or else pure carbon in the form of carbon black. A prerequisite for good sinterability is from 2 to 6% by weight of carbon distributed as homogeneously as possible on the surface of the boron carbide powder particles.

Phenolic resins have particularly good qualifications for achieving this homogeneous distribution. In the production of dense bodies according to this process, a boron carbide slip provided with the necessary auxiliaries is first sprayed to form a granular material and this is made into a suitable shape by uniaxial pressing. The green shaped bodies are subsequently heat-treated at about 1000° C., the phenolic resins being pyrolyzed so that finally each boron carbide powder is surrounded by a thin shell of amorphous carbon. Besides this process, the direct dispersion of carbon black is also a suitable process for introducing carbon as sintering aid if it is ensured that the distribution of the carbon black particles is sufficiently homogeneous.

Both of the sintering additives are associated with not inconsiderable process problems. Phenolic resins tend to stick in the uncarbonized state, considerably impairing the flow ability of the sprayed granular materials, so that the automatic filling of pressing dies can become problematic. In addition, boron carbide powders doped with phenolic resin "age" as a result of polymerization reactions, which is why these powders have to be stored at low temperatures.

Additions of carbon black, which do not show either of these disadvantages, can, in contrast, only be dispersed with difficulty, so that the sintering aid is not always present in sufficiently homogeneous distribution on the boron carbide surfaces, which finally leads to unsatisfactory sintered densities, i.e., to sintered bodies having open porosity (less than 92% TD). Such bodies cannot, without encapsulation, be further densified by hot isostatic pressing to densities greater than 99% of the theoretical density (TD). However, bodies having ρ greater than 99% TD are a prerequisite for the usability of boron carbide in numerous applications.

In addition, in American Institute of Physics, *Conference Proceedings Boron-Rich Solids*, No. 213, pp. 464–467, Zakhariev and Radev describe a process for the pressureless sintering of boron carbide with the inclusion of a liquid phase. This process is based on mixing boron carbide with tungsten carbide and reacting this mixture with the formation of $W_2B_5$ in accordance with $$5B_4C + 8WC \rightarrow 13C + 4W_2B_5 \tag{1}$$

Here, the action of $W_2B_5$ in promoting sintering is utilized. $W_2B_5$ is a sintering aid for boron carbide because the two substances form a quasibinary eutectic system with a eutectic temperature of about 2220° C. The experiments of Zakhariev and Radev showed that at sintering temperatures above the eutectic temperature, i.e., at sintering temperatures above 2220° C., sintered densities of greater than 90% TD are achieved. Below 2220° C., i.e., without liquid phase, only densities of less than 82% TD were achieved (see FIG. 2 of the cited reference). Solid phase sintering of boron carbide, utilizing the sintering-promoting action of free carbon, which is formed by the addition of tungsten carbide and a subsequent reaction at temperatures below the sintering temperature in accordance with equation (1), is consequently not possible by the process described. The process according to Zakhariev and Radev, which is characterized by high sintering temperatures and the formation of liquid phases, greatly accelerates the grain growth of boron carbide, which is a disadvantage. Because of the anisotropy of boron carbide, coarse-grained microstructures causes high residual stresses and finally cracks, so that boron carbide, bodies having a coarse microstructure are unusable for practical applications.

SUMMARY OF THE INVENTION

It is therefore an object of the present invention to provide an improved process for producing polycrystalline dense shaped bodies of boron carbide, metal diboride and carbon by pressureless sintering, in which the above-mentioned disadvantages are avoided.

According to the invention, this object is achieved by (a) homogeneously mixing pulverulent boron carbide with at least one pulverulent monocarbide of the elements selected from the group consisting of Ti, Zr, Hf, V, Nb and Ta in an amount corresponding to from 2% to 6% by weight of free carbon, based on the total weight of the boron carbide;

(b) shaping this mixture into green bodies of a density of at least 50% TD;

(c) heating the preformed green body thus obtained to from about 800° C. to 1500° C. with exclusion of oxygen in a sintering furnace and maintaining it within this temperature range for from 10 to 120 minutes; and (d) subsequently sintering the preformed body by heating to from 2100° C. to 2250° C.

The monocarbides of the elements Ti, Zr, Hf, V, Nb and Ta are hereinafter designated as metal carbides (MC).

Since these metal carbides, in comparison with carbon black or phenolic resins, are substantially more similar to boron carbide, the introduction of such powders, in comparison with the sintering aids which have hitherto been customary, causes only minor process problems. Boron carbide powders doped with metal carbides do not show any inherent tendency to stick and metal carbide powders are, in contrast to carbon black, miscible with boron carbide powders without problems.

Advantageously, this powder mixture can, in contrast to known phenolic resin-doped powders, be stored for a long period of time without special precautions.

Boron carbide reacts with these metal carbides to give carbon, in accordance with the equation $$B_4C + 2MC \rightarrow 3C + 2MB_2 \tag{2}$$

with borides of the type $MB_2$ remaining as an additional phase. It is known that for sufficient sinterability of boron carbide between 2% and 6% by weight of free carbon, based on the total weight of the boron carbide, are necessary. From FIG. 1 it can be seen that when using pure boron carbide a minimum of about 6% by weight and a maximum of about 38% by weight of metal carbide powder in the starting mixture are necessary to establish the desired carbon content in accordance with equation (2).

If the boron carbide powder used already contains free carbon, which is generally the case, then the amounts of metal carbide to be added should be reduced by a proportion corresponding to the free carbon present.

The metal carbides are preferably used in amounts which lead to a free carbon content of from 2.5% to 5% by weight, based on the amount of boron carbide in the end product. Particular preference is given to using the metal carbides in amounts which lead to a free carbon content of from 3% to 4% by weight, based on the amount of boron carbide in the end product. The amounts of metal carbides to be used in each case in the starting powder mixture can be taken from FIG. 1.

In accordance with reaction equation (2), the amounts of $MB_2$ shown in FIG. 2 are then formed in the process of the invention as a function of the desired free carbon content (based on the boron carbide content). It can be seen from FIG. 2 that, as a result of the carbon contents (from 2% to 6% by weight) necessary for the sinterability of boron carbide, between 4% and 13% by volume of $MB_2$ are formed.

A substantial advantage of the process of the invention in comparison with known prior art processes is that the process steps (c) and (d) take place in the same sintering cycle. A further advantage of the process is that the $MB_2$ formed during the process step (c) has a grain-growth-inhibiting effect on the boron carbide matrix. Since excessive grain growth inhibits the densification, the $MB_2$ fraction formed in process step (c) thereby also acts to promote sintering in step (d).

The starting material used to carry out the process of the invention is advantageously a boron carbide powder having a purity of at least 98.5% by weight, which for the purposes of the present invention means that the sum of boron and carbon analyses is at least 98.5% by weight, with a B:C atom ratio in the range of from 3.5 to 4.5:1. Metallic impurities totalling up to 0.5% by weight can be tolerated. The remaining contribution to make up 100% by weight is divided between oxygen and nitrogen in the form of adhering boron oxide and boron nitride, with the sum of oxygen+nitrogen analyses being less than 1% by weight. As a measure of the required particle size, the specific surface area (measured by the BET method) is advantageously used.

Boron carbide powders having a specific surface area in the range from 5 to 50 $m^2/g$ have proven to be particularly well sinterable.

The boron carbide powder used can be amorphous or crystalline; it can be obtained directly by deposition from the gas phase, for example, from boron halides or boranes and gaseous hydrocarbons. However, for economic reasons it is advantageous to start with coarse-grained, crystalline boron carbide which has been prepared on a large scale, for example, by the process of melt reduction of boric acid by carbon in an electric furnace. This carbide is first subjected to intensive milling to produce particle sizes of about 3 μm and finer, and the powder having the desired specific surface area is subsequently separated therefrom by conventional known methods such as air classification or elutriation.

The metal carbides are advantageously used in commercial form having FSS particle sizes of less than 10 μm, preferably less than 5 μm, particularly preferably less than 2.5 μm. The metal carbides can be used individually or in any mixture in the process of the invention.

The procedure for carrying out the process of the invention is as follows.

The boron carbide powder is first homogeneously mixed with the specified metal carbide(s) (preferably in powder form) by mixing in a suspension or, if desired, by mix-milling.

The mixing of the boron carbide powder with the metal carbide (preferably in powder form) is advantageously achieved by dispersing the metal carbide and the boron carbide powder in a solution. If desired, temporary binders and/or lubricants can also be added. Solvents which can be used are, for example, acetone and lower aliphatic alcohols having from 1 to 6 carbon atoms. Preference is given to using water as solvent. Suitable temporary binders and/or lubricants are all compositions which are customary for these purposes. Examples of such temporary binders are polyvinyl alcohol, polystyrene or paraffin; and examples of the lubricants include stearic acid, metal stearates or polyethylene glycol. When using these pressing aids, preference is given to using amounts up to a total of at most 2% by weight, based on the resulting mixture. Dispersion can be carried out by mechanical agitation of a liquid suspension in plastic vessels using a magnetic stirrer coated with polytetrafluoroethylene or by kneading of a viscous suspension in a kneading apparatus. After removal of the solvent, which can, for example, be carried out in the case of a liquid suspension by spray or freeze drying; or, in the case of a viscous suspension, by evaporation during the kneading process, the homogeneous powder obtained is shaped into the desired body having a density of at least 50% TD.

The homogeneous powder is made into a suitable shape by conventional known ceramic shaping processes, such as, for example, dry pressing, cold isostatic pressing, injection molding, extrusion or slip casting, with formation of green bodies. In dry pressing, a pressure between 300 and 6000 bar, preferably from 1000 to 3000 bar, is usually used.

If pressing aids and binders were present in the starting powder mixture, these can, if desired, be removed again prior to sintering by means of a separate heat treatment, for example, at temperatures of about 400° C.

The preformed bodies are subsequently heated with exclusion of oxygen in a vacuum furnace, preferably having a heating element of carbon, to temperatures in the range between 800° C. and 1500° C., preferably between 1250° C. and 1400° C., and maintained at this temperature for from 10 to 120 minutes preferably from 15 to 60 minutes. The metal carbide here reacts with part of the boron carbide to give free carbon and metal diboride. Finally, the bodies are heated further, preferably in the same furnace with exclusion of oxygen, to temperatures in the range between 2100° C. and 2250° C., preferably between 2125° C. and 2200° C., particularly preferably between 2140° C. and 2170° C. and maintained at this temperature for from 10 to 600 minutes, preferably from 30 to 300 minutes, particularly preferably from 60 to 120 minutes, and finally slowly cooled to room temperature.

The specified process steps are advantageously carried out in one sintering cycle. However, it is naturally likewise possible to carry out the individual process steps separately.

The materials produced according to the process of the invention comprise, besides boron carbide, from 2% to 6% by weight of carbon, based on the boron carbide, and from 3% to 14% by volume of metal diboride.

The materials produced by the process of the invention have the following characteristics and properties.

Density, at least 92% of the theoretically possible density of the composite material; hardness HK0.1 greater than 2500; flexural fracture strength (measured by the four-point method at room temperature), at least 300 MPa.

Once the state of closed porosity (ρ greater than 92% TD) has been achieved by sintering, the sintered bodies can, if higher densities are required, be further densified by hot isostatic pressing. This is advantageously carried out prior to cooling to room temperature, by application of pressure by means of a gaseous pressure transfer medium such as argon at temperatures between 1900° C. and 2150° C. at a pressure of from 5 to 200 MPa for a period of from 5 to 60 minutes.

This further densification by unencapsulated hot isostatic pressing eliminates the majority of the pores still present, so that the finished material then has a density greater than 98% TD.

The excellent properties of the shaped bodies which have been pressureless sintered by the process of the invention make possible their use in the area of erosion technology, for example, as sandblasting nozzle or water jet nozzles.

The shaped bodies of the invention are also suitable, in particular, for use as cutting materials, preferably for non-ferrous metals. They are particularly suitable for machining Al-Si cast alloys.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views:

FIG. 2 shows the relationship between the free carbon formed in the sintered shaped body and the proportion by volume of the metal diborides formed.

DETAILED DESCRIPTION OF PREFERRED EMBODIMENTS

Figure 1:
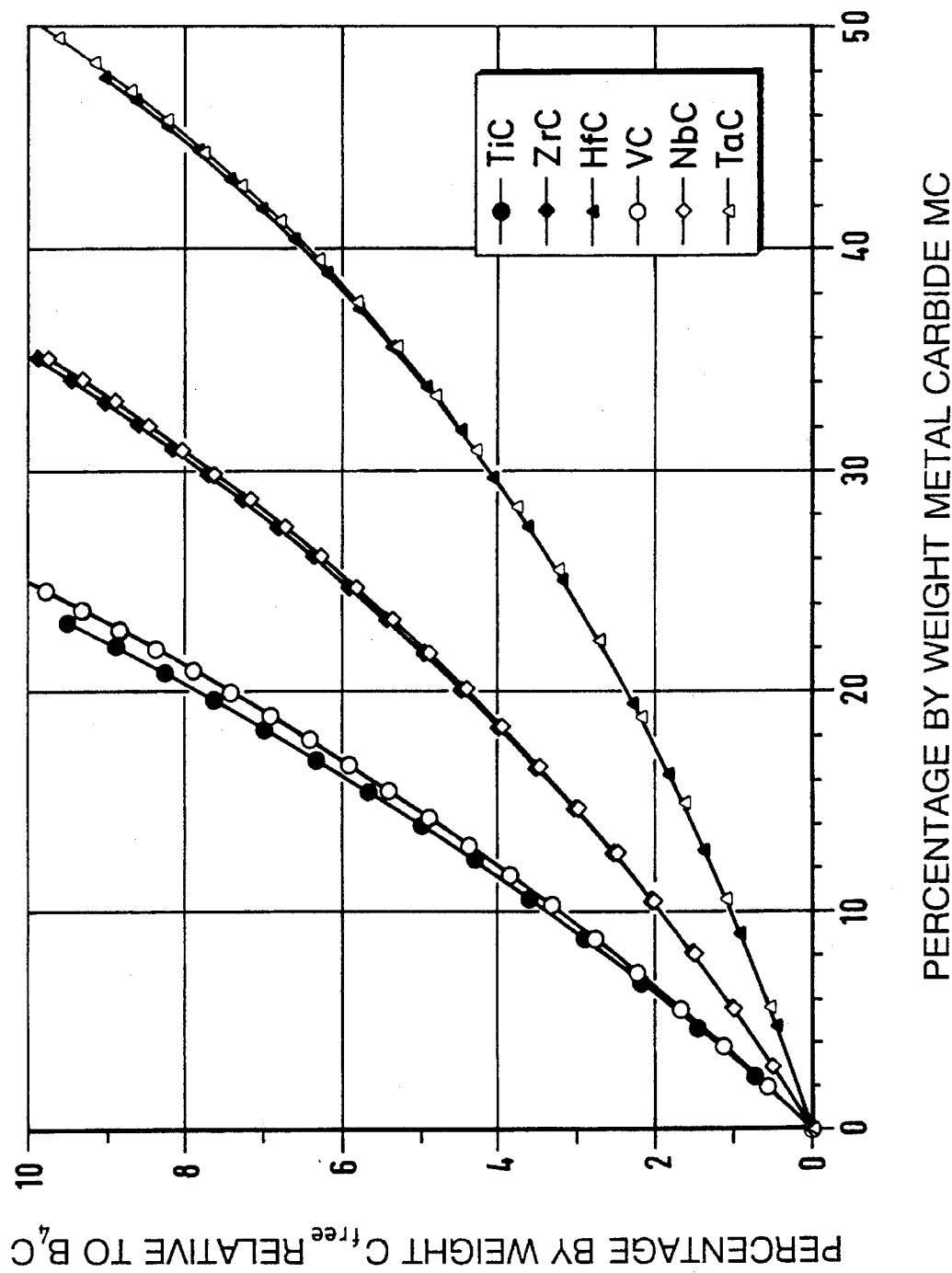
FIG. 1 shows the relationship between the % by weight of metal carbides used in the starting powder mixtures and the % by weight of free carbon in the sintered shaped bodies.

The following Examples illustrate the invention. The powders used in the Examples are specified in Table 1.

TABLE 1

Particle Size and Composition of the $B_4C$ and MC Powders Used in the Examples.

| Powder | FSSS [μm] | BET [m²/g] | $C_{free}$ [wt. %] | Manufacturer |
|---|---|---|---|---|
| $B_4C$ | — | 15.5 | 0.6 | ESK, Kempten, Germany |
| TiC | 1.5 | 0.81 | 0.2 | H.C. Starck, Goslar, Germany |
| VC | 1.8 | 0.62 | 0.3 | H.C. Starck, Goslar, Germany |
| HfC | 2.8 | 0.17 | 0.3 | H.C. Starck, Goslar, Germany |
| TaC | 1.7 | 0.25 | 0.3 | H.C. Starck, Goslar, Germany |
| NbC | 1.9 | 0.42 | 0.3 | H.C. Starck, Goslar, Germany |
| ZrC | 3.2 | 0.28 | 0.4 | H.C. Starck, Goslar, Germany |

FSSS = Fisher sub-sieve sizer

EXAMPLE 1

762.4 g of $B_4C$ having a specific surface area of 15.5 m²/g (Table 1) and 37.6 g of TiC (Table 1) were milled in 1.2 dm³ of n-heptane, in which 16 g of paraffin had previously been dissolved, in a planetary ball mill for 30 minutes at 120 rpm. The powder mixture was dried in a rotary evaporator and subsequently deagglomerated in a rotor mill. This powder was cold isostatically pressed into cuboids of dimensions 60x20x20 mm³ at a pressure of 200 MPa. The green bodies were heated to 1200° C. in a vacuum furnace under 10 mbar of argon at a heating rate of 15° C./min. Heating was carried out at a rate of 2.5° C./min through the temperature interval from 1200° C. to 1500° C. in which the reaction of $B_4C$ with TiC to give free carbon and $TiB_2$ takes place. Subsequently, the bodies were heated at a heating rate of 10° C./min to the sintering temperature of 2150° C. and maintained at this temperature for 120 min and finally cooled.

After sintering, the test specimens had a density of 2.47 g/cm³ and closed porosity. Further densification by hot isostatic pressing at a temperature of 2100° C. under an argon pressure of 200 MPa achieved a density of 2.56 g/cm³ which corresponds to the theoretical density.

In this body, the reaction of $B_4C$ with TiC formed 3.1% by volume of $TiB_2$ and 2.2% by weight of free carbon, based on the amount of $B_4C$ after the reaction. The free carbon was identified as the 2H modification of graphite by X-ray analysis.

EXAMPLE 2

728.8 g of $B_4C$ powder having a specific surface area of 15.5 m²/g (Table 1) and 71.2 g of TiC powder (Table 1) were milled, dried, pressed and subsequently sintered and hot isostatically pressed as described in Example 1. The density after sintering was 2.55 g/cm³ and after hot isostatic pressing was 2.63 g/cm³. In this body, the reaction of $B_4C$ with TiC formed 6.1% by volume of $TiB_2$ and 3.7% by weight of free carbon, based on the amount of $B_4C$ after the reaction.

EXAMPLE 3

698.4 g of $B_4C$ powder having a specific surface area of 15.5 m²/g (Table 1) and 101.6 g of TiC powder (Table 1) were milled, dried, pressed and subsequently sintered and hot isostatically pressed as described in Example 1. The density after sintering was 2.61 g/cm³ and after hot isostatic pressing was 2.68 g/cm³. In this body, the reaction of $B_4C$ with TiC formed 8.3% by volume of $TiB_2$ and 6.0% by weight of free carbon, based on the amount of $B_4C$ after the reaction.

EXAMPLE 4

727.2 g of $B_4C$ powder having a specific surface area of 15.5 m²/g (Table 1) and 72.8 g of VC powder (Table 1) were milled, dried, pressed and subsequently sintered and hot isostatically pressed as described in Example 1. The density after sintering was 2.54 g/cm³ and after hot isostatic pressing was 2.65 g/cm³. In this body, the reaction of $B_4C$ with VC formed 5.3% by volume of $VB_2$ and 3.6% by weight of free carbon, based on the amount of $B_4C$ after the reaction.

EXAMPLE 5

572 g of $B_4C$ powder having a specific surface area of 15.5 m²/g (Table 1) and 228 g of HfC powder (Table 1) were milled, dried, pressed and subsequently sintered and hot isostatically pressed as described in Example 1. The density after sintering was 3.17 g/cm$^3$ and after hot isostatic pressing was 3.26 g/cm$^3$. In this body, the reaction of B$_4$C with HfC formed 8.7% by volume of HfB$_2$ and 4.8% by weight of free carbon, based on the amount of B$_4$C after the reaction.

EXAMPLE 6

568.8 g of B$_4$C powder having a specific surface area of 15.5 m$^2$/g (Table 1) and 231.2 g of TaC powder (Table 1) were milled, dried, pressed and subsequently sintered and hot isostatically pressed as described in Example 1. The density after sintering was 3.18 g/cm$^3$ and after hot isostatic pressing was 3.31 g/cm$^3$. In this body, the reaction of B$_4$C with TaC formed 8.0% by volume of TaB$_2$ and 3.9% by weight of free carbon, based on the amount of B$_4$C after the reaction.

EXAMPLE 7

688 g of B$_4$C powder having a specific surface area of 15.5 m$^2$/g (Table 1) and 112 g of NbC powder (Table 1) were milled, dried, pressed and subsequently sintered and hot isostatically pressed as described in Example 1. The density after sintering was 2.66 g/cm$^3$ and after hot isostatic pressing was 2.77 g/cm$^3$. In this body, the reaction of B$_4$C with NbC formed 6.1% by volume of NbB$_2$ and 3.4% by weight of free carbon, based on the amount of B$_4$C after the reaction.

EXAMPLE 8

680.8 g of B$_4$C powder having a specific surface area of 15.5 m$^2$/g (Table 1) and 119.2 g of ZrC powder (Table 1) were milled, dried, pressed and subsequently sintered and hot isostatically pressed as described in Example 1. The density after sintering was 2.71 g/cm$^3$ and after hot isostatic pressing was 2.77 g/cm$^3$. In this body, the reaction of B$_4$C with ZrC formed 7.4% by volume of ZrB$_2$ and 3.7% by weight of free carbon, based on the amount of B$_4$C after the reaction.

While several embodiments of the present invention have been shown and described, it is to be understood that many changes and modifications may be made thereunto without departing from the spirit and scope of the invention as defined in the appended claims.

What is claimed is:

1. A process for producing shaped bodies of boron carbide, metal diboride and carbon, which comprises
    (a) homogeneously mixing pulverulent boron carbide with at least one pulverulent monocarbide of an element selected from the group consisting of Ti, Zr, Hf, V, Nb and Ta in an amount which forms from 2% to 6% by weight of free carbon, during subsequent heating, based on the total weight of the boron carbide to produce a mixture;
    (b) shaping this mixture into a preformed body of a density of at least 50% TD;
    (c) heating the preformed body thus obtained to from about 800° C. to 1500° C. with exclusion of oxygen in a sintering furnace and maintaining it within this temperature range for from 10 to 120 minutes; and
    (d) subsequently sintering by pressureless sintering the preformed body by heating to from 2100° C. to 2250° C., such that a sintered body containing from 2% to 6% by weight of free carbon is obtained.

2. The process as claimed in claim 1, wherein the pulverulent boron carbide used has a specific surface area of from 5 to 50 m$^2$/g.

3. The process as claimed in claim 1, wherein the pulverulent monocarbide of an element selected from the group consisting of Ti, Zr, Hf, V, Nb and Ta used has a particle size of less than 5 μm.

4. The process as claimed in claim 1, comprising
    further densifying said shaped body by hot isostatic pressing subsequent to process step (d).

* * * * *